Aug. 19, 1952   V. G. MARTENS   2,607,154
BOBBER
Filed Oct. 25, 1949

Inventor
Vincent G. Martens
By Clarence A. O'Brien
and Harvey B. Jackson
Attorneys Patented Aug. 19, 1952

2,607,154

UNITED STATES PATENT OFFICE 2,607,154

BOBBER

Vincent G. Martens, Rockwell City, Iowa

Application October 25, 1949, Serial No. 123,459

9 Claims. (Cl. 43—43.11)

This invention relates to a bobber of novel construction and design, the primary object of which is to make it possible to cast with any length of line between the bobber and hook.

An important object of this invention is to provide a bobber in which the portion of the line carrying the sinker and hook is wound about the bottom thereof, the bobber having a means for retaining the sinker and hook at a predetermined distance from the bobber when the portion of the line is unfurled from the bobber. A further important object of this invention is to provide a bobber having a means for holding the line against movement in the downward direction, which means allows the line to become free running relative to the bobber when the hook and sinker are retrieved.

A further object of this invention is to provide a bobber of the character described which includes a means enabling easy threading of the line on the bobber, fin means carried by the bobber to prevent and retard excessive spinning thereof as the line unwraps therefrom, and a means carried at the top of the bobber to prevent the line from wrapping around the bobber as the line descends into the water.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification reference characters indicate corresponding elements throughout.

Figure 1:
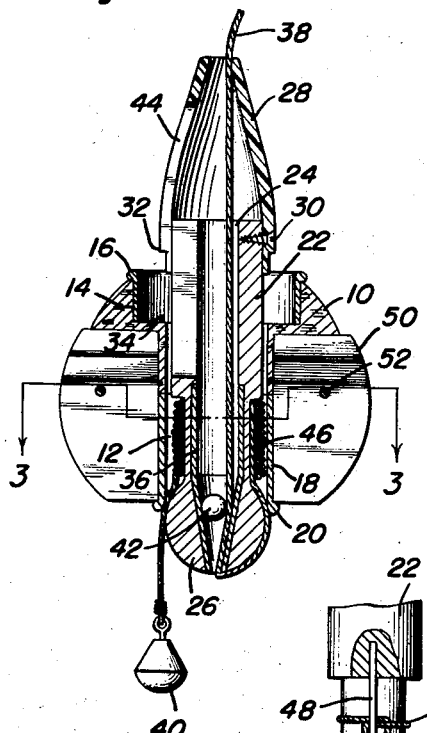
Figure 1 is a sectional view taken substantially on the plane of section line 1—1 of Figure 2.
Figure 2:
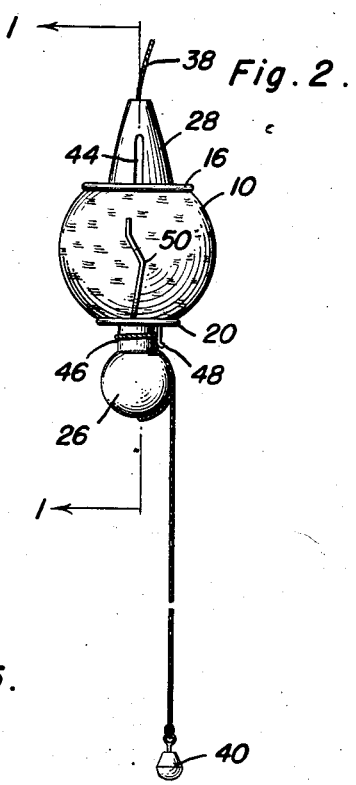
Figure 2 is a side elevational view of the present bobber.

In order to make a long cast, it becomes necessary to retain the sinker, hook and bobber on the line relatively close to each other. After the cast is made, the hook and sinker should be retained at a predetermined distance, roughly equivalent to the depth of the body of water, from the bobber. The present bobber has been constructed and designed to perform this function easily and accurately.

The bobber consists of a float 10, preferably fabricated of cork, and of any desired size and shape, although an oblate spheroidal shape is desired. The float is provided with a bore 12 extending through the bottom and top thereof and retained in the bore is an upper metallic sleeve 14 having a bead or flange 16 engaging the upper edge of the float and another sleeve 18 having a bead or flange 20 engaging the lower end of the float.

Slidable in the sleeves 14 and 18 is a tubular member 22 having an axial bore 24. The tubular member and associated parts, as will be described hereinafter, may be fabricated of wood or metal and is of lesser buoyancy than the float 10. To limit the sliding movement of the tubular member in the float, the bottom end of the tubular member is provided with an enlarged, preferably spherical head 26, while at its upper end a conical tube 28 is secured as at 30 to the tubular member 22. The conical tube 28 has a shoulder 32 which is adapted to engage an inwardly extending annular shoulder 34 in the float 10 to limit the downward movement of the tubular member 22 within the float, while the spherical head 26 is adapted to engage the lower end of the sleeve 18 to limit the upward movement of the tubular member within the float.

Secured to the bottom end of the tubular member 22 and extending through the spherical head 26 is a tapered tube or collar 36 for a purpose soon to appear. The line 38 extends through the conical tube 28, the tubular member 22, and the tapered collar 36 and carries at its bottom end a sinker 40, it being understood that the line will also retain a hook (not shown) adjacent the sinker. A ball 42 is positioned in the tapered portion of the collar 36 and is adapted to frictionally engage the line 38 to prevent downward movement of the line relative to the float, which ball will roll upwardly in the collar 36 so as to allow the line, sinker and hook to move freely in the tubular member 22 during the retrieving stage, whereupon the sinker will engage the spherical head 26 and move therewith. The tubular member 22 and the conical tube 28 are provided with an elongated slot 44 to allow ease of threading the line within the tubular member.

Figure 5:
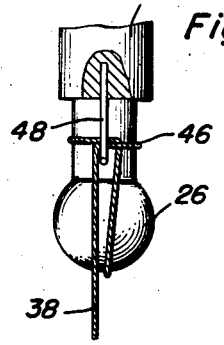
Figure 5 is a fragmentary side elevational view of a detail of construction and looking from the right on Figure 2.
Figure 3:
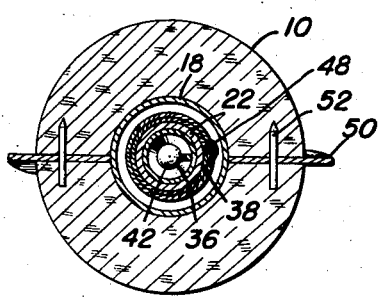
Figure 3 is a sectional view taken substantially on the plane of section line 3—3 of Figure 1.
Figure 4:
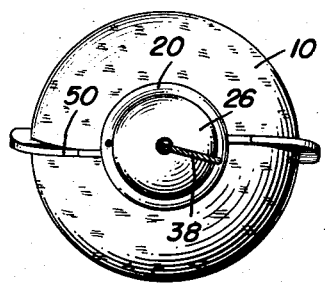
Figure 4 is a bottom plan view of the bobber.

The line 38 has a portion 46 which is wound about the bottom end of the tubular member 22 above the spherical head 26 and is yieldingly retained on the tubular member by means of a spring clip 48 secured in any suitable manner in one side of the tubular member, as shown clearly in Figure 5. Laterally extending fins 50 are secured as at 52 to the float 10. The first wrap of the predetermined length of line is placed under the spring clip. This procedure makes it possible to retrieve the line without losing the selected length of line when the bobber would otherwise slide down to the sinker on this retrieve. Such sliding will not occur unless the wrap of line is jerked free from the spring clip by an outside force. The purpose of the spring clip is to prevent the ball 42 from being dislodged within the tubular member when the bobber is used in rapid flowing water. If the ball 42 becomes dislodged then, of course, the bobber would float down stream until it is engaged by the sinker 40. By utilizing the spring clip 48 the line 38 is maintained in taut position so that the ball 42 will at all times maintain the line against the conical portion of the tubular member. Thus the tubular member and the bobber are maintained immovable relative to the line 38 even when being utilized in fast running water. Only one or two wraps of line are placed under the clip and the remainder of the predetermined length of line is wrapped on the outside of the clip. If all of the predetermined length of line were placed under the clip then the effectiveness of the bobber would be lost until some outside force pulled all of the line from underneath the clip.

In use, the line 38 is pulled through the tubular member to provide a predetermined length of line between the sinker 40 and the bottom of the float 10. This portion of the line 46 between the sinker and the float is wound about the bottom portion of the tubular member 22 and retained thereon by means of the force of gravity causing float 10 and flange 20 to bear on spherical head 26 thereby jamming line 46 close to sinker which in turn will be jammed or held tighter by centrifugal force in the first movements of casting. While the line is being cast the tubular member 22 will remain in snug position with its spherical head 26 jamming the line 46 between it and the float member. When the bobber strikes the water the tubular member 22, being of lesser buoyancy than the float member, will move downwardly relative to the float member and the portion 46 of the line 38 will unwind or unfurl its full predetermined length, the line being drawn downwardly by the weight of the sinker 40. The sinker cannot descend a greater length than the predetermined distance of the sinker from the float, being retained at this distance by means of the friction ball 42. When the line 38 is retrieved, a pull thereon will roll the ball 42 upwardly in the tapered collar 36 and allow the line, with the sinker and hook thereon, to move freely within the tubular member enabling the bobber to be retrieved as well.

Frequently, the fisherman must determine the depth of the water and the present bobber construction can be easily employed for this purpose. A greater length of line is wound about the tubular member than the estimated depth of the water to be measured. The line and bobber are then thrust into the water and as the line unfurls, the bobber stays in an upright position. When the sinker touches the bottom, the bobber immediately turns on its side. The bobber and line are then retrieved, and since some of the line still remains wrapped around the bottom end of the tubular member 22, this member 22 will be drawn upwardly into the float, thereby holding the line immovable relative to the bobber so that the length of the line between the bobber and the sinker will be the approximate depth of the water.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A bobber comprising a float having a bore therethrough, a tubular member slidable in said bore of lesser buoyancy than said float, a line having a sinker on one of its ends threaded through said tubular member, a portion of said line being wound about an end of said tubular member, and means for yieldingly retaining said line portion on said tubular member, before said line portion is unfurled.

2. The combination of claim 1 wherein said means includes a spring clip carried by said tubular member and adapted to engage said line portion.

3. The combination of claim 1 wherein said tubular member includes enlarged portions at its ends serving as stops limiting the sliding movement of said tubular member in said float, said line jamming between one of said stops and said float in response to a pull of gravity on said float.

4. A bobber comprising a float having a bore therethrough, a tubular member slidable in said bore of lesser buoyancy than said float, a line having a sinker on one of its ends threaded through said tubular member, a portion of said line being wound about an end of said tubular member, means for yieldingly retaining said line portion on said tubular member before said line portion is unfurled, and means for holding said line against movement in one direction in said tubular member and for retaining said sinker a predetermined distance from said float, said last-named means including a tapered collar carried by said tubular member and a ball in said collar frictionally engaging said line.

5. The combination of claim 4 wherein said line portion retaining means includes a spring clip carried by said tubular member and adapted to engage said line portion, said retaining means allowing the line to be retrieved without changing the predetermined length of the line and preventing disengagement of the line by a jerk on the line below the bobber.

6. A castable bobber comprising a float having a bore therethrough, a tubular member movable within said bore a distance substantially less than the diameter of said float and of lesser buoyancy than said float, said member being adapted to accommodate a line extending therethrough and having a portion thereof adapted to carry a very substantial portion of said line wound therearound in retracted position, and means associated with said member for retaining said line portion on said tubular member while said bobber is being cast and for releasing the same when said bobber strikes the water.

7. A castable bobber comprising a float member having a bore therethrough, a tubular member carried within said bore for limited movement relative thereto and being of lesser buoyancy than said float member and being adapted to receive and accommodate a line extending therethrough, said tubular member having a portion thereof adapted to carry in encircled relation and in cooperation with said float member a substantial portion of said line while said members are being cast and to release said line portion to extended position when said members strike the water.

8. The structure defined in claim 7, and means disposed within said tubular member for releasably connecting said tubular member to said line.

9. A bobber comprising a float having a bore therethrough, a tubular member slidable in said bore of lesser buoyancy than said float, said tubular member being adapted to receive a fishing line therethrough and having a lower end portion having a circumferential surface adapted to receive a substantial portion of such line wound therearound and to be received at least partially into the bore of said float with such line wound therearound to positively and cooperatively retain such wound line portion in wound position during casting operations and to move downwardly out of said bore and thereby release said wound line portion when said float strikes the water to permit the line to unfurl.

VINCENT G. MARTENS.

REFERENCES CITED

The following references are of record in the file of this patent:

UNITED STATES PATENTS

| Number | Name | Date |
| --- | --- | --- |
| 717,237 | Marsters | Dec. 30, 1902 |
| 790,301 | Jones | May 23, 1905 |
| 1,072,005 | Hartley | Sept. 2, 1913 |
| 2,065,854 | Edel et al. | Dec. 29, 1936 |
| 2,153,869 | Jones | Apr. 11, 1939 |
| 2,239,911 | Dorn | Apr. 29, 1941 |
| 2,254,800 | Furdas | Sept. 2, 1941 |
| 2,493,971 | Johnson | Jan. 10, 1950 |